Patented Nov. 12, 1946

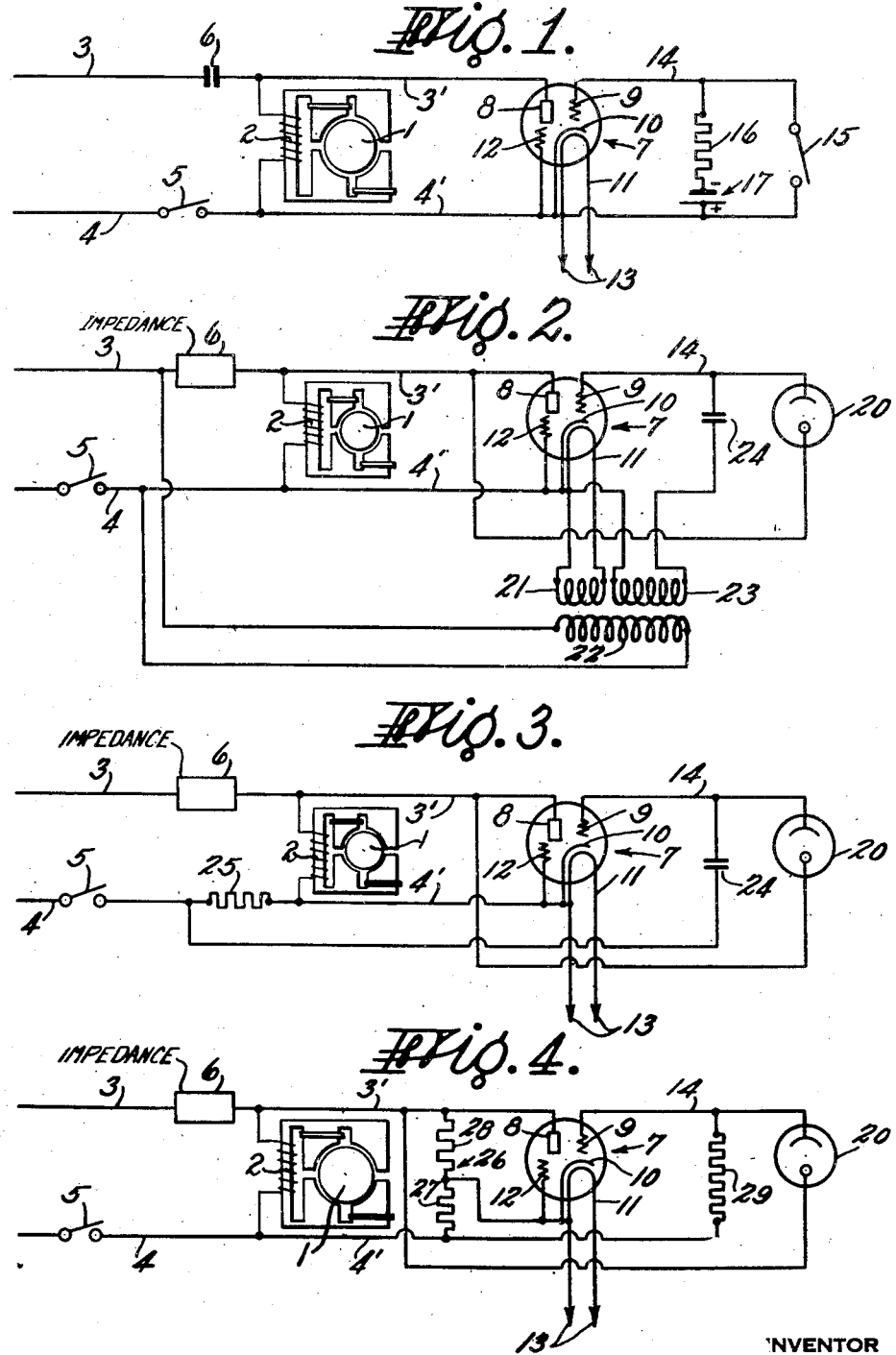

2,411,051

UNITED STATES PATENT OFFICE 2,411,051

CONTROL APPARATUS FOR ALTERNATING CURRENT MOTORS

Theodore J. Mesh, Easthampton, Mass., assignor to Gilbert & Barker Manufacturing Company, West Springfield, Mass., a corporation of Massachusetts Application June 19, 1944, Serial No. 540,930

3 Claims. (Cl. 172—274)

This invention relates to the control of alternating current motors, such for example as the synchronous motors used as timing motors for various purposes.

The invention has for its object the provision of means for stopping an alternating current motor in response to any suitable control element and holding it in its stopped position, without opening the switch by which the motor was started.

More particularly, the invention has for an object the provision of a rectifying means for alternating current, which means is shunted across the motor winding so that, when placed in action, it will short circuit the positive half cycles of the voltage wave. The result is the elimination from the motor of the major part of the positive half cycles of the voltage wave, whereby the motor will be stopped almost instantly and will be held magnetically in its stopped position as long as the rectifying means remains in action.

According to a further object of the invention, the rectifying means consists of a grid-controlled rectifier tube of the vacuum or gaseous type, such means being capable of actuation by a minute quantity of electric power, as for example, that derived from the use of a phototube as the control element.

These objects will best be understood as the detailed description proceeds and they will be pointed out in the appended claims.

The invention will be disclosed with reference to the accompanying drawing, in which, Figs. 1 to 4 are diagrammatical views showing the invention in several different embodiments.

Referring to Fig. 1 of this drawing, 1 represents the rotor of an alternating current motor and 2 its field, the latter being connected across the wires 3 and 4, which supply alternating current at suitable voltage and frequency, such for example as the usual commercial supply at 115 volts and 60 cycles. The motor may be a small synchronous motor such as is used in timing motors. One example of one such motor will be found in the patent to Haydon No. 2,049,261, dated July 28, 1936. The Haydon motor is of the shaded pole type. The motor is started manually or automatically by any suitable switch, represented by 5 and shown as interposed in wire 4. Also interposed in the circuit to the timing motor is an impedance 6 of any suitable kind, preferably a condenser, for reasons which will later appear.

This invention has to do with the stopping of the timing motor and is characterized in that the motor is stopped without the use of a switch or relay in the supply circuit of the motor winding. For this purpose, I provide for the rectification of the alternating voltage wave, drawing a pulsating direct current through wires 3' and 4' of such magnitude as to produce for all practical purposes the effect of a short circuit across the motor field on the positive half cycles of voltage. Impedance 6 is included in the circuit, first, for the purpose of limiting the current flow in the rectifier during the above mentioned short circuit periods, and, second, for the purpose of dropping the voltage across motor field 2 to a very low value, when rectified current flows through the wires 3' and 4'. The resultant effect is the elimination from the field of the motor of the major portion of the positive half cycles of the voltage wave and the motor stops instantly and is held magnetically against movement as long as rectified current flows through the wires 3' and 4'.

A preferred form of rectification means is a grid-controlled, gaseous-discharge rectifier tube, represented at 7, and in which 8 is the plate, 9 the grid, 10 the cathode, 11 the tube heater and 12 the shielding grid. The particular tube shown is a Thyratron. The plate 8 and cathode 10 are connected to wires 3' and 4' respectively. The plate-cathode circuit of tube 7 is thus coupled directly to the terminals of the winding of the motor. The impedance 6 may for example be a condenser having a capacity of 1 mfd. The tube heater 11 is connected to any suitable source of electricity at low voltage, represented by the wires 13, and say for example six volts. One terminal of the heater 11 is also connected to wire 4', as is also the terminal of the shielding grid 12. The grid 9 is connected, as by a wire 14, to one terminal of any suitable control element, herein conventionally represented by the switch 15, and to the other terminal of which the wire 3' is connected. Connected in series across the wires 4' and 14 is a resistor 16 and a tube bias, represented by the battery 17. This bias is a fixed voltage, and may be either direct or alternating. The bias prevents the tube 7 from operating until the desired action has taken place. When the tube 7 is actuated by the closing of the control element 15, it allows current to flow from plate 8 to cathode 10 but not in a reverse direction and the motor is stopped as above set forth.

The impedance 6 limits the current through the tube 7 and preferably causes the motor voltage to fall to a very low value, approaching zero on the positive half cycles. This impedance may be a resistor, condenser, or an inductance. A resistor may be most economical provided sufficient voltage is available to allow some loss or drop through it under running conditions. The use of a condenser to produce approximate resonance with the timing motor may provide an actual increase in voltage at the motor over the supply voltage. When the tube 7 operates, the motor current falls to a very low value because the resonance is destroyed. With the use of a condenser the power loss is nil. Where higher motor currents are necessary, to secure locking of the timing motor, as for example in those cases where a spring has been wound up by the motor and must be held against unwinding during the motor-locking period, a resistance or inductance may be used at 6 to provide for any value of current desired.

In Fig. 2, the invention has been shown in an embodiment where the control element is a phototube 20, electrically connected across the plate 8 and grid 9 of tube 7. Here the tube heater 11 is shown as supplied from a six volt secondary 21 of a transformer, the primary 22 of which is connected to the wires 3, 4 of the supply source. A secondary 23 of the same transformer may supply 6 to 12 volts alternating current as the bias for tube 7. A condenser 24 may be connected in the bias circuit, as shown, and preferably is so connected where the bias voltage is alternating. The other connections are as shown in Fig. 1. The operation is substantially the same as in Fig. 1, except that the presence of light on the phototube 20 starts the operation of tube 7. The phototube provides an exceedingly sensitive control element and causes operation of tube 7 by a minute amount of electrical power.

In Fig. 3, the bias is obtained from a resistor 25 in series with the timing motor. The other connections are substantially the same as in Fig. 2. Because the timing motor has inductance as well as resistance, the voltage across it differs slightly in phase from the bias voltage obtained across resistor 25. This is an undesirable condition and is overcome by applying the bias to the grid of tube 7 through the condenser 24. The latter charges up because of the rectifying action of the grid 9 and provides a direct current bias. The condenser 24 has a capacity of .001 mfd. more or less.

In Fig. 4, bias is obtained from a voltage divider 26, connected across the timing motor and consisting of resistors 27 and 28. The resistance 27 is low enough in value so as not to interfere appreciably with the action of tube 7. As here shown, the bias is in phase with the motor voltage, being obtained directly from it. Therefore, the bias may be applied to the grid 9 of the tube 7 through a resistor 29, having a resistance of 5 megohms, more or less. A condenser may nevertheless be used in place of the resistor 29 in this circuit, if desired.

The different figures show different methods of obtaining grid bias. The methods shown are not exclusive and any other suitable ones may be used as desired.

In all the figures of the drawings, there is the same fundamental invention, namely, a rectifying means set into action by a control element of any suitable form and acting to change the normal alternating voltage wave across the motor to one of unsymmetrical form and of such nature as to prevent rotation of the motor.

As an example of one practical use of the invention, it may be used to stop the control shaft of a timing motor at a predetermined position after some operation has been effected and to hold such shaft in such position as long as some certain condition is satisfied, as evidenced by the control element. Then, when such condition is no longer satisfied, the motor may be released and allowed to continue to turn to another position to effect some other operation.

I claim:

1. The combination with a single phase alternating current motor having a main field winding and a shaded pole winding for starting purposes, of a circuit including said main field winding and adapted for connection to a supply of alternating current, a grid-controlled electronic rectifier tube having its plate-cathode circuit coupled to said first-named circuit in parallel with said main field winding, an impedance in said first-named circuit in series with the plate-cathode circuit of said tube and with said main field winding and of such value as to limit the current flow through said plate-cathode circuit to a safe value, and control means operable by changing the grid potential of said tube to directly control its action and to place the same into or out of action to respectively stop the motor or enable it to operate.

2. The combination with a single phase alternating current motor having a main field winding and a shaded pole winding for starting purposes, of a circuit including said main field winding and adapted for connection to a supply of alternating current, an electronic rectifier tube having its plate-cathode circuit coupled to said first-named circuit in parallel with said main field winding, an impedance in said first-named circuit in series with the plate-cathode circuit of said tube and with said main field winding and of such value as to limit the current flow through said plate-cathode circuit to a safe value, and means for changing the plate-cathode circuit from a non-conducting condition in which said motor operates normally in the first-named circuit to a conducting condition in which the current flow through the main field winding is changed to uni-directional form to stop the motor and hold it in its stopped position.

3. The combination with a single phase alternating current motor having a main field winding and a shaded pole winding for starting purposes, of a circuit including said main field winding and adapted for connection to a supply of alternating current, an electronic tube having its plate-cathode circuit coupled to the first-named circuit in parallel with said main field winding, a capacitor in the first named circuit in series with said main field winding and with the plate-cathode circuit and of such value as to produce resonance in the first-named circuit at the frequency of the supply, and control means for changing the plate-cathode circuit from a non-conducting condition, in which the motor operates normally in the first-named circuit, to a conducting condition, whereby the action of the tube destroys the resonance of the first-named circuit and converts the current through the main field winding to uni-directional form to stop the motor and hold it in its stopped position.

THEODORE J. MESH.